Figure 1:
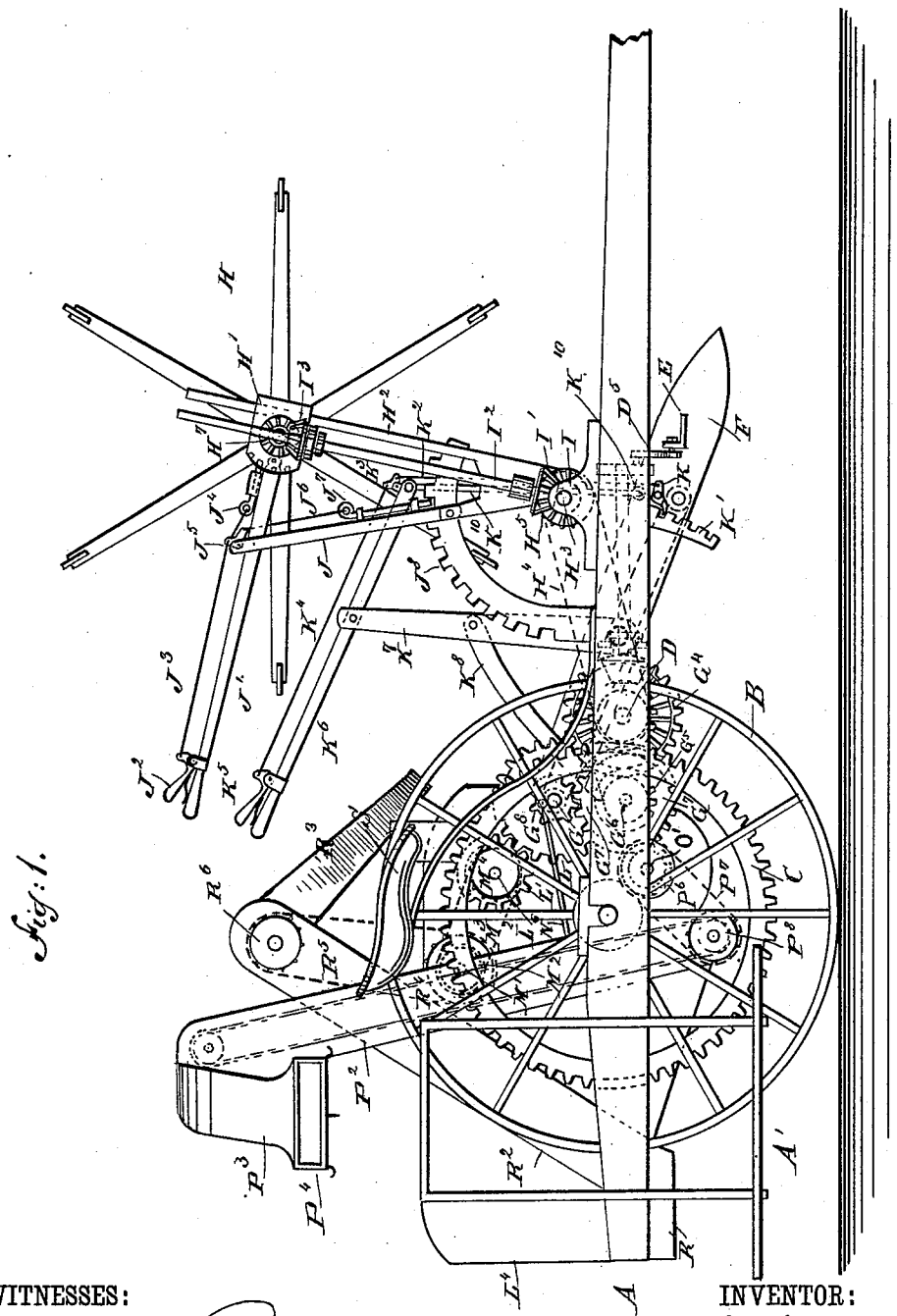

(No Model.) 5 Sheets—Sheet 1.
L. A. GILLETT.
COMBINED HARVESTER AND THRASHING MACHINE.
No. 396,153. Patented Jan. 15, 1889.

WITNESSES:
INVENTOR:
BY
ATTORNEYS.

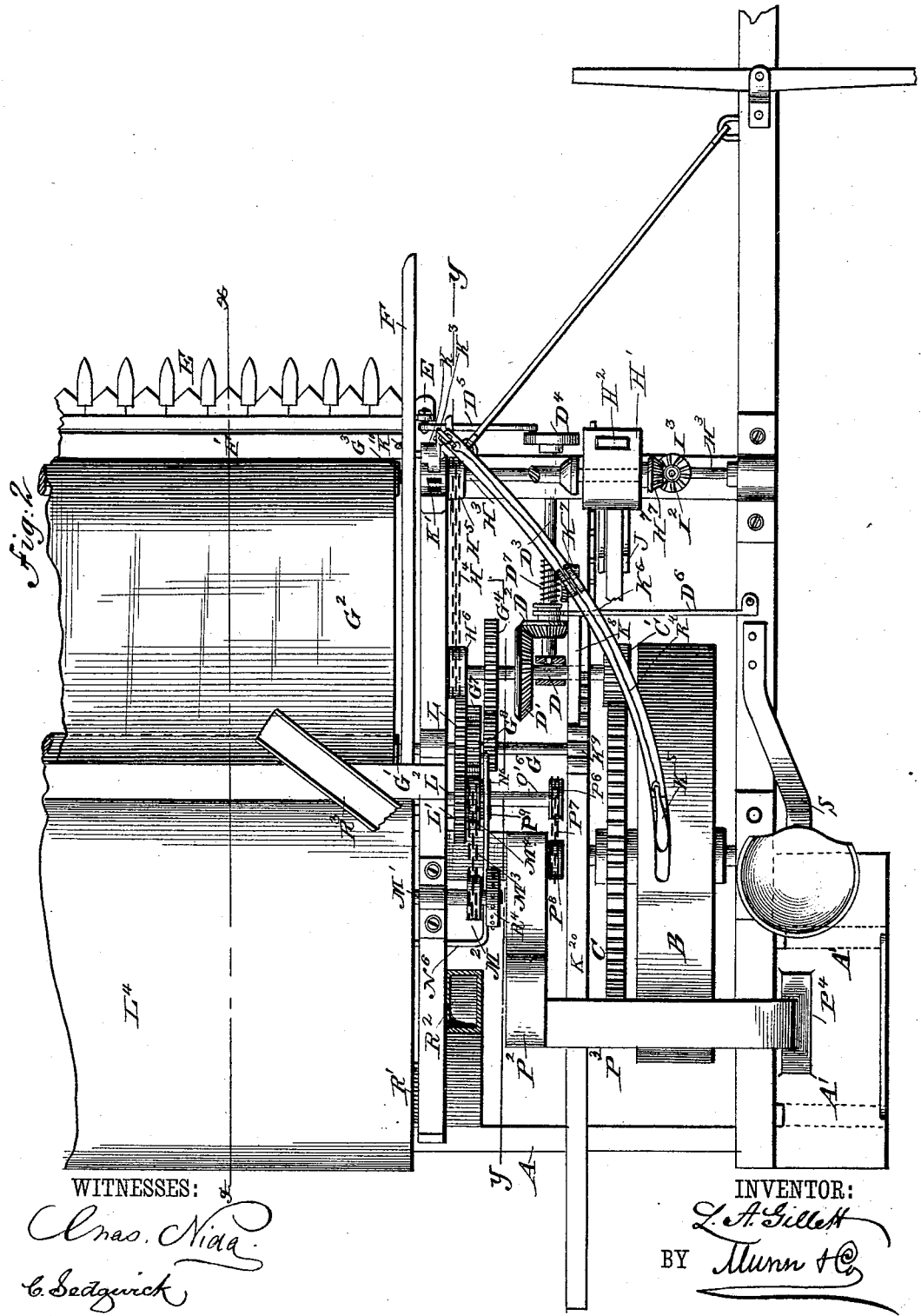

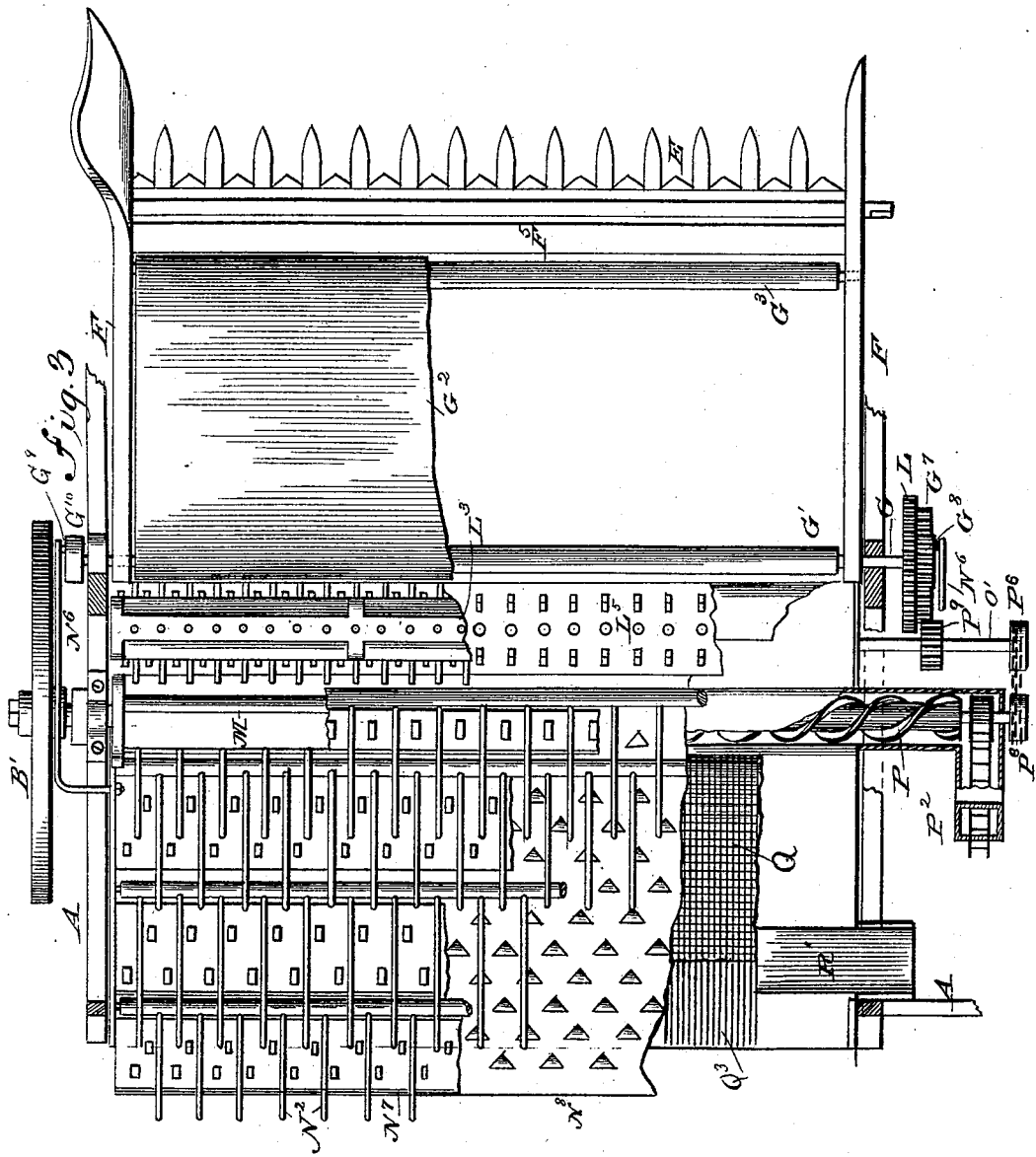

(No Model.) 5 Sheets—Sheet 4.
L. A. GILLETT.
COMBINED HARVESTER AND THRASHING MACHINE.
No. 396,153. Patented Jan. 15, 1889.
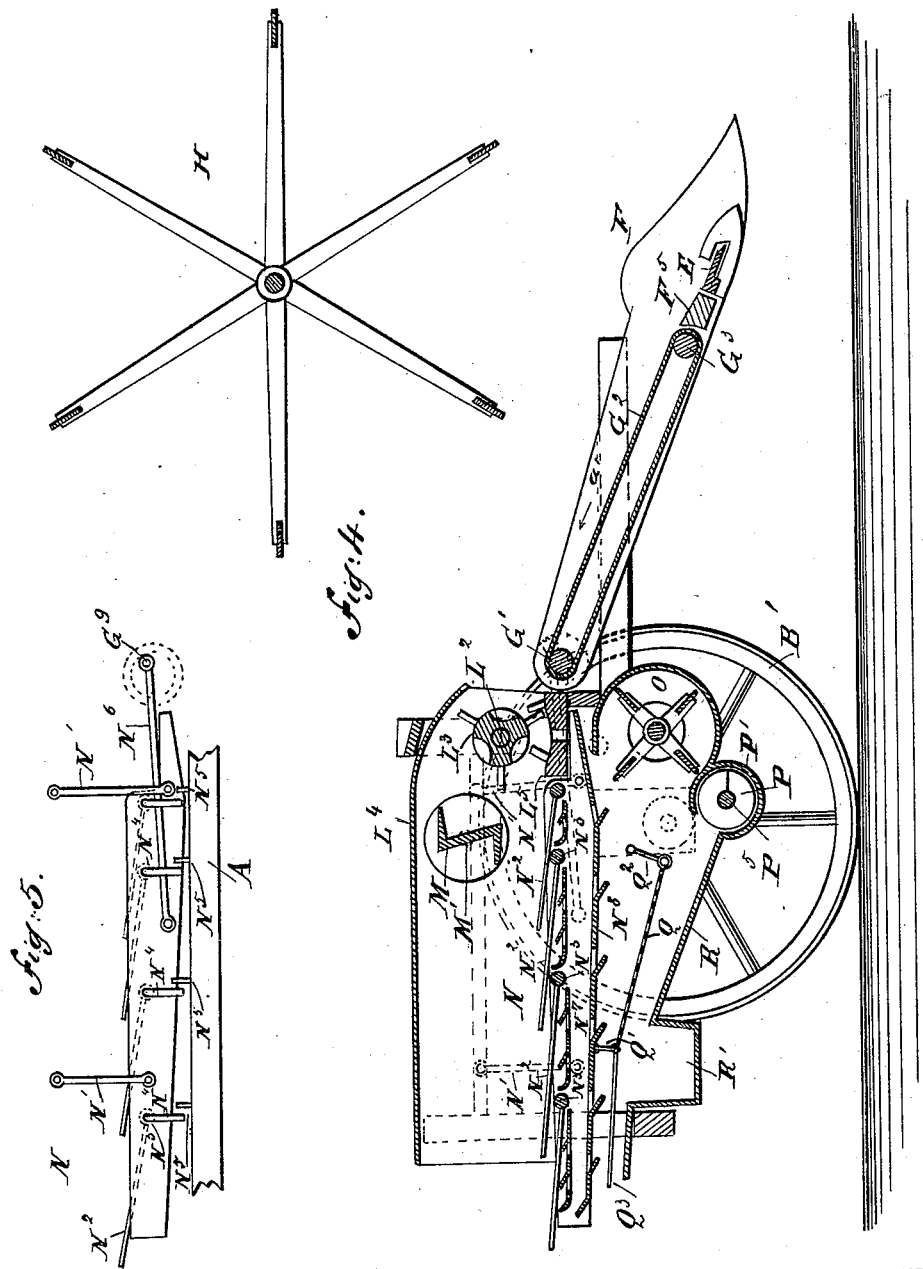
WITNESSES:
INVENTOR:
L. A. Gillett
BY Munn & Co
ATTORNEYS.

(No Model.) 5 Sheets—Sheet 5.
L. A. GILLETT.
COMBINED HARVESTER AND THRASHING MACHINE.
No. 396,153. Patented Jan. 15, 1889.
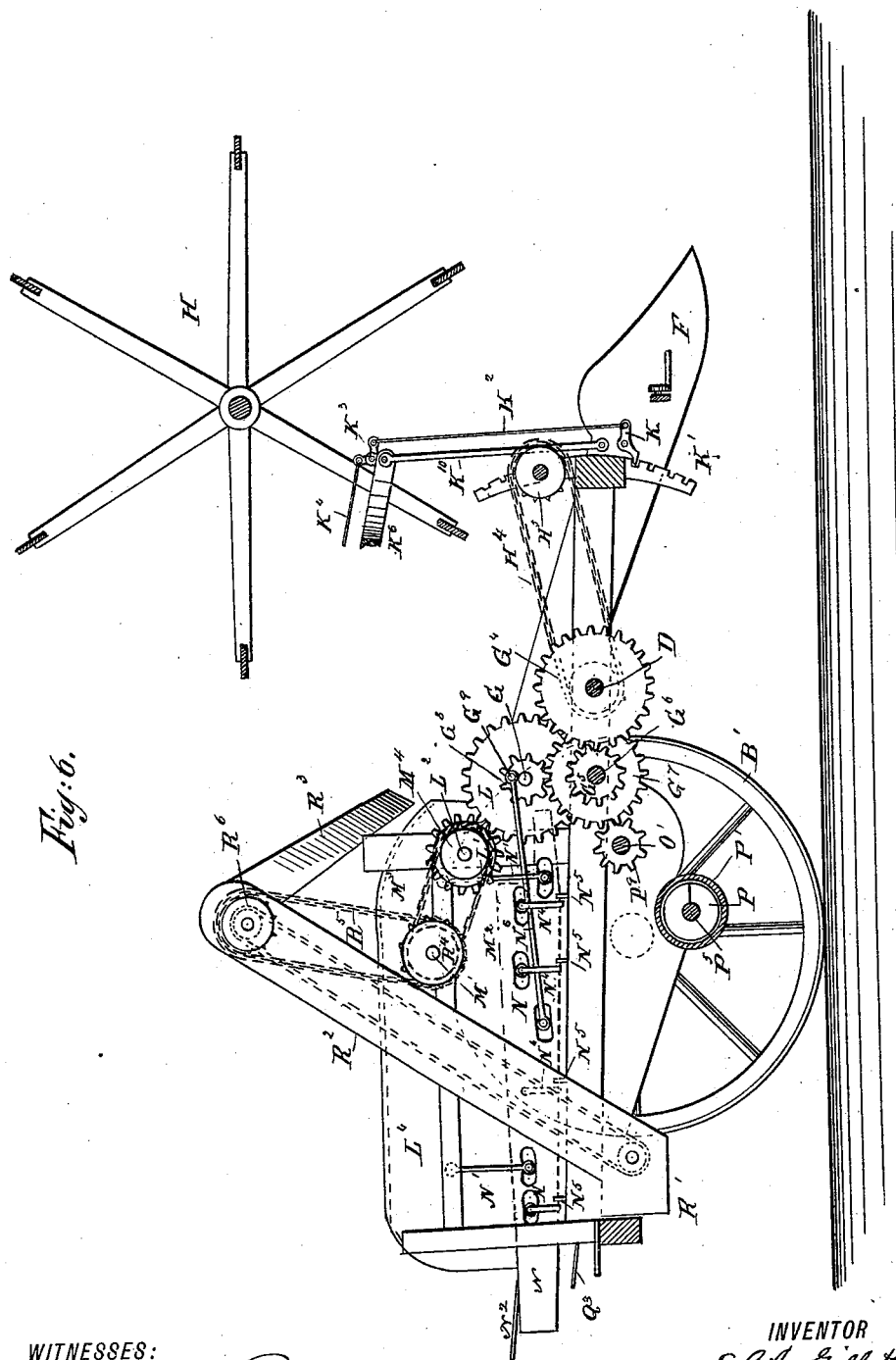

UNITED STATES PATENT OFFICE.

LESTER ALFONZO GILLETT, OF LEONARDVILLE, KANSAS.

COMBINED HARVESTER AND THRASHING-MACHINE.

SPECIFICATION forming part of Letters Patent No. 396,153, dated January 15, 1889.

Application filed October 25, 1887. Serial No. 253,294. (No model.)

*To all whom it may concern:*

Be it known that I, LESTER ALFONZO GILLETT, of Leonardville, in the county of Riley and State of Kansas, have invented a new and Improved Combined Harvester and Thrashing-Machine, of which the following is a full, clear, and exact description.

The object of my invention is to provide a new and improved combined harvester and thrashing-machine which is simple and durable in construction, compact in form, and very effective in operation.

The invention consists in the construction and arrangement of various parts and details of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of my improvement. Fig. 2 is a plan view of one side of the same with parts broken away. Fig. 3 is a similar view of the other side of the same with parts broken away. Fig. 4 is a longitudinal sectional elevation of my improvement on the line $x\ x$ of Fig. 2. Fig. 5 is a side elevation of the shaker and its connections; and Fig. 6 is a vertical section of the machine, taken on the line $y\ y$, Fig. 2, looking grainward.

On a suitably-constructed frame, A, are mounted the wheels B and B′, supporting said frame above the ground, and of which the wheel B is also the main driving-wheel, which imparts motion to the several parts of the machine when the latter travels forward. On the hub or axle of the driving-wheel B is secured a gear-wheel, C, which meshes into the pinion C′, secured to an auxiliary shaft, D, mounted transversely in suitable bearings on the frame A and carrying the bevel gear-wheel D′, meshing into the bevel-pinion $D^2$, secured to the shaft $D^3$, mounted in suitable bearings fitted loosely upon the shaft D at its rear end, the forward end thereof being mounted in the main frame A, as shown. The shaft $D^3$ carries on its front end a crank-wheel, $D^4$, connected by the pitman $D^5$ with the cutter-bar E, of any approved construction, and held to slide in the swinging frame F, fulcrumed on a shaft, G, mounted transversely in suitable bearings on the main frame A and carrying a roller, G′, over which passes the endless belt or apron $G^2$, the latter also passing over the roller $G^3$, mounted in the frame F near the cross-bar $F^5$, separating the lower end of the belt $G^2$ from the cutter-bar E. The grain cut by the cutter falls upon the endless belt $G^2$ and is carried upward by the same. A lever, $D^6$, pivoted on the main frame A, is connected with the bevel-pinion $D^2$, to throw the latter in and out of gear, and the said lever is adapted to be operated by the driver's foot. A spring, $D^7$, presses against the pinion $D^2$ to hold it in mesh.

The shaft G is operated from the auxiliary shaft D by the gear-wheel $G^4$ on said shaft D meshing into the gear-wheel $G^5$, secured to a short intermediate shaft, $G^6$, mounted transversely in suitable bearings on the frame A. On the shaft $G^6$ is secured the gear-wheel $G^7$, which meshes into the gear-wheel $G^8$, secured to the shaft G. Above the endless belt $G^2$ and the cutter-bar E is held to rotate the reel H, of any approved construction and mounted in the adjustable bearing H′, adapted to slide on the reel-post $H^2$, fulcrumed on the shaft $H^3$, mounted transversely on the frame A and connected by the sprocket-chain $H^4$ and the sprocket-wheels $H^5$ and $H^6$ with the auxiliary shaft D, which thus imparts motion to said shaft $H^3$. On the latter is secured a bevel gear-wheel, I, meshing into the bevel-pinion I′, secured to the lower end of the shaft $I^2$, mounted in suitable bearings, one of which is secured to the reel-post $H^2$ and the other to the adjustable bearing H′. The shaft $I^2$ on this latter bearing carries the bevel gear-wheel $I^3$, which turns with said shaft $I^2$, and is adapted to slide up and down on the same with the adjustable bearing H′. The bevel gear-wheel $I^3$ meshes into the bevel gear-wheel $H^7$, secured to the stubble end of the shaft of the reel H, said shaft passing through the bearing H′.

On the reel-post $H^2$ is pivoted the arm J, near the upper end of which is pivoted the lever J′, on which is fulcrumed the hand-lever $J^2$, connected by the link $J^3$ with the pawl $J^4$, held to slide in suitable bearings on said lever J′, and adapted to engage notches formed on the adjustable bearing H′. The link $J^3$ also operates the bell-crank lever $J^5$, connected by the link $J^6$ with the pawl $J^7$, adapted to engage with its lower end the notched segment J⁸, secured to the main frame A. The segment J⁸ has its center in the axis of the shaft H³. By the means just described the reel H can be held in a forward or rearward position and can be raised or lowered at will by the operator manipulating said lever J' and the hand-lever J², pivoted on the same.

The frame F can be raised or lowered and held in any desired locked position by the lever-pawl K, pivoted on said frame F and adapted to engage with one end a toothed segment, K', secured to the main frame A. The other end of the lever-pawl K is connected by the link K² with the bell-crank lever K³, connected by the link K⁴ with the hand-lever K⁵, pivoted on one end of the lever K⁶, fulcrumed on the arm K⁷, pivoted on the main frame A, and adapted to be held in any desired position by the arm K⁸, pivoted by one end to said arm K⁷, and engaging with its other end the notches K⁹, formed on top of the longitudinal beam K²⁰ of the main frame A. The bell-crank lever K³ is pivoted to the forward end of the lever K⁶, said forward end being connected by the link K¹⁰ with the frame F, so that the operator can raise or lower the frame F and lock the same in position by one movement of the lever K⁶ and its hand-lever K⁵, above described.

On the endless-belt shaft G is secured a gear-wheel, L, meshing into a gear-wheel, L', secured to the shaft L², mounted transversely in suitable bearings on the main frame A, and carrying the thrashing-cylinder L³ of the thrashing-machine, located in the thrashing-machine casing L⁴, which is open at the front and rear, and into which leads, at the front end, the endless belt G², thus feeding the cut grain directly to the thrashing-cylinder L³, which may be of any approved construction and provided with the usual teeth operating in connection with similar fixed teeth secured in the thrashing-cylinder concave L⁵.

In the rear of the thrashing-cylinder L³ is located the straw-beater M, of Z shape in cross-section, and secured to a shaft, M', mounted in suitable bearings in the thrashing-machine casing L⁴, and carrying on one end the sprocket-wheel M², over which passes the sprocket-chain M³, the latter also passing over a sprocket-wheel, M⁴, secured to the thrashing-cylinder shaft L². The thrashing-cylinder L³ and its concave L⁵ open at the rear upon the shaker N, hung on arms N', pivotally secured to the thrashing-machine casing L⁴. The shaker N is provided with the beating-arms N², secured to the transverse shafts N³, held in suitable bearings in the sides of the shaker N. Each of the shafts N³ is provided on one end with a crank-arm, N⁴, adapted to strike against a fixed lug, N⁵, secured to one of the longitudinal beams of the main frame A, as is plainly shown in Fig.

The shaker N receives a swinging motion from the rotation of the shaft G by means of the gear-wheel G⁸, crank-wheel G¹⁰, and the wrist-pins G⁹, secured on the outer faces thereof and connected with the sides of the shaker by means of the links N⁶. The shaker N is also provided between said shafts N³ with sieves N⁷, opening upon the perforated bottom N⁸, located below it. Upon this bottom N⁸ open at the front the apertures in the thrashing-cylinder concave, so that part of the grain from the thrashing-cylinder passes through these apertures in the concave L⁵ and upon the inclined bottom N⁸, which discharges the grain toward the fan or blower O, located below said bottom N⁸, and forcing the grain, after cleaning the same of lighter impurities, to the screw P, rotating in the cylinder P', which discharges the grain at one side of the machine into an elevator, P², extending upward, and delivering the grain into a chute, P³, provided at its mouth, P⁴, with hooks or other suitable means for attaching bags held on the platform A' on one side of the main frame A.

The elevator P² is operated from the shaft O' of the blower O by means of the sprocket-wheel P⁶, which is connected to the sprocket-wheel P⁸ on the screw-shaft by the chain P⁷. The shaft O' is provided with a gear, P⁹, which meshes with the gear-wheel G⁷ on the auxiliary shaft G⁶, so that the latter when rotated from the auxiliary shaft D imparts motion to the screw P and elevator P², as will be clearly understood by reference to Fig. 3 of the drawings. Part of the grain passing through the perforated bottom N⁸ of the shaker N drops on the inclined riddler Q, pivotally connected at its rear end by a link, Q', with the bottom N⁸. The front end of the riddler Q is hung on the crank-arm Q², fulcrumed in the sides of the thrashing-machine casing L⁴. (See Fig. 4.)

The riddler Q is perforated and opens upon the inclined bottom R of the casing L⁴, said bottom leading at its lower end to the screw P and at its upper end to the inclined chaff-box R', of any approved construction, and arranged transversely in the casing L⁴ and opening at its lower stubble end into the elevator R², extending upward and opening at its upper end upon the chute R³, discharging the chaff upon the endless belt G². The chaff-elevator R² is operated from the beater-shaft M', which carries a sprocket-wheel, R⁴, over which passes a sprocket-chain, R⁵, the latter also passing over the sprocket-wheel R⁶, secured to the upper shaft of the elevator R². On the upper end of the riddler Q are secured the rearwardly-extending prongs Q³, leading to the rear open end of the thrashing-machine casing L⁴, and serving to discharge the chaff which does not drop into the chaff-box R' at the rear of the machine. The main frame A is also provided with a driver's seat, S, located in such a manner that the operator can conveniently manipulate the levers J' and K⁶.

The operation is as follows: The operator, seated on the seat S, raises and lowers the front end of the swinging frame F, according to the depth to which the grain is to be cut. The raising and lowering of the frame is accomplished by the operator's taking hold of the lever $K^6$ and pressing on the hand-lever $K^5$, so as to unlock the frame F, by means of the lever-pawl K engaging the notched segment $K'$. The operator then moves the lever $K^6$ up or down, so that the link $K^{10}$ raises or lowers the swinging frame F. The reel H is then adjusted to suit the position of the swinging frame F and the nature of the grain to be cut. This is accomplished by the operator's taking hold of the lever $J'$ and pressing on the hand-lever $J^2$, so that the pawl $J^4$ disengages from the notches on the bearing $H'$, which is moved up or down on the post $H^2$ by the operator's raising or lowering the handle end of said lever $J'$, as the latter is pivotally connected with said bearing $H'$. The swinging frame F, when adjusted to its desired position, is again locked in position by the operator releasing the lever $K^5$, so that the lever-pawl K engages the notched segment $K'$, and when the reel H is in the desired position then the operator releases the hand-lever $J^2$, so that the pawl $J^4$ again engages one of the notches on the sliding bearing $H'$, so that the latter is held in a locked position on the post $H^2$. When the machine is now moved forward, the main driving-wheel B imparts a rotary motion to the auxiliary shaft D by the gear-wheel C and pinion $C'$. The motion of the auxiliary shaft D is imparted to the shaft $D^3$ by the gear-wheel $D'$ and pinion $D^2$, and the rotary motion of the shaft $D^3$ is converted into a reciprocating motion by means of the crank-wheel $D^4$ and the pitman $D^5$, said reciprocating motion being imparted to the cutter which cuts the grain. The latter is moved upon the endless belt $G^2$ by the action of the reel H, which is revolved from the auxiliary shaft D by the connections above described. The endless belt $G^2$ receives a motion in the direction of the arrow $a'$, Fig. 4, from the auxiliary shaft D by means of the gear-wheels $G^7$, $G^8$, $G^5$, and $G^4$, gear-wheel $G^8$ being connected with the shaft G, carrying the roller $G'$, over which passes said endless belt $G^2$. Thus the grain falling upon the endless belt $G^2$ is carried upward and fed into the front open end of the thrashing-machine casing $L^4$, and finally passes in between the thrashing-cylinder $L^3$ and the concave $L^5$. The thrashing-cylinder $L^3$ separates the kernels from the straw, and the former pass through the apertures in the concave $L^5$ upon the bottom $N^8$, and through the same to the screw P. The straw passes upon the beater-arms $N^2$, which receive an up-and-down motion by the crank-arms $N^4$ of the beater-shafts $N^3$ coming in contact with the fixed lugs $N^5$. The shaking motion of the shaker N separates the chaff, kernels, and straw, so that the latter, impelled by the thrashing-cylinder and beater, passes out of the rear of the casing $L^4$, while the chaff and the kernels fall upon the perforated bottom $N^8$, and through the said bottom upon the riddler Q. The force of the wind from the fan O drives the lighter particles to the rear of the machine, while the kernels drop through the riddler Q upon the inclined bottom R, which delivers the grain to the feed-screw P. The smaller particles of the chaff drop through the prongs $Q^3$ into the chaff-box $R'$, which also receives lighter particles falling through the riddler Q upon the inclined bottom R, being forced from the latter into the chaff-box $R'$ by the force of the wind from the fan O. The kernels, after passing to the feed-screw P, are delivered by the latter to the elevator $P^2$, which delivers the same into the chute $P^3$, from which they pass into a bag or other receptacle held on the mouth $P^4$ of said chute $P^3$. The operator standing on the platform $A'$ can pass the bags or receptacles when filled with the kernels to the wagon traveling beside the machine. The grain may also be elevated directly into a wagon traveling with the machine, instead of in the bags, as above described. The chaff from the chaff-box $R'$ is carried upward by the elevator $R^2$ and is delivered into the chute $R^3$, which delivers the chaff upon the endless belt or apron $G^2$, and the latter carries the same again to the thrashing-cylinder $L^3$ with the grain cut by the cutter. The arms $N^2$, located in the rear of the thrashing-cylinder $L^3$, operate in the usual manner, and hence need no further description.

Having thus fully described my invention, I claim as new and desire to secure by Letters Patent—

1. The combination, with a swinging frame carrying the cutter-bar and the endless carrying-belt, of a link connected with said swinging frame, a lever carrying said link, a lever-pawl pivoted on said swinging frame, a fixed notched segment engaged by said lever-pawl, and means, substantially as described, for connecting said lever-pawl with the handle end of said lever, so as to enable the operator to raise and lower the swinging frame and lock the same in position, substantially as shown and described.

2. The combination, with the swinging frame F, of the link $K^{10}$, pivotally connected with the swinging frame F, the arm $K^7$, mounted on the main frame, the lever $K^6$, fulcrumed on the arm $K^7$ and pivotally connected with the link $K^{10}$, the hand-lever $K^5$, fulcrumed on said lever $K^6$, the link $K^4$, connected with the hand-lever $K^5$, the bell-crank lever $K^3$, fulcrumed on the end of said lever $K^6$ and connected with the link $K^4$, the link $K^2$, connected with said bell-crank lever $K^3$, the lever-pawl K, connected with said link $K^2$ and pivoted on said swinging frame F, and the fixed segment $K'$, provided with notches in which said lever-pawl K engages, substantially as shown and described.

LESTER ALFONZO GILLETT.

Witnesses:
P. D. SMITH,
CHARLES BACON.